United States Patent Office 3,321,624
Patented May 23, 1967

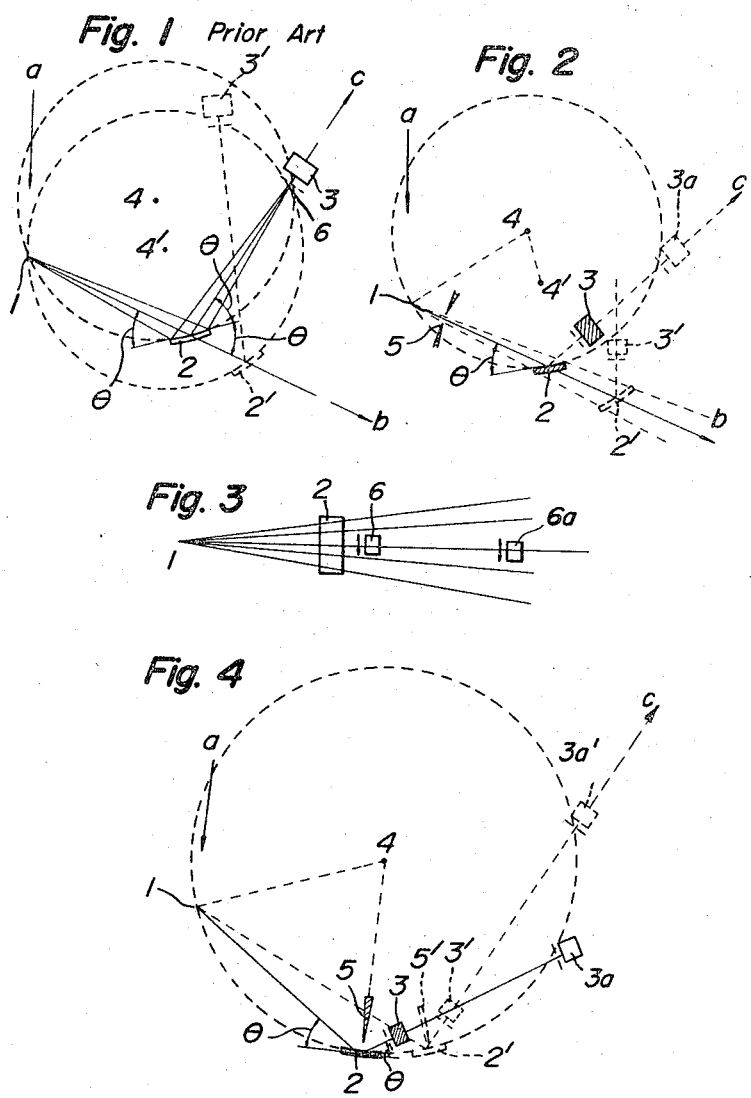

3,321,624
X-RAY SPECTROMETER APPARATUS HAVING A DETECTOR LOCATED WITHIN THE CIRCUMFERENCE OF THE ROWLAND CIRCLE
Seigo Kishino, Tokyo, Teruichi Tomura, Kodaira-shi, and Hiroshi Okano, Hachioji-shi, Japan, assignors to Hitachi, Ltd., Chiyoda-ku, Tokyo, Japan, a corporation of Japan
Filed Feb. 25, 1964, Ser. No. 347,224
Claims priority, application Japan, Apr. 5, 1963, 38/17,215
5 Claims. (Cl. 250—49.5)

This invention relates to an improvement in an X-ray spectrometer apparatus for detecting X-rays diffracted from an analysing crystal.

It is well known that by impinging an accelerated electron beam focused by an electron lens onto a specimen in vacuum and by detecting the resulting X-rays emitted from the specimen by a highly sensitive X-ray detector, the chemical composition of the specimen can be determined easily. In order to effect a most efficient detection of the characteristic X-rays, the prior techniques employed the procedure of diffracting such characteristic X-rays with a curved crystal to further focus the diffracted X-rays onto the detector. For the purpose of focusing the diffracted X-rays accurately onto the detector, it is necessary that the centre of the crystal and the centre of the slit of the detector all be disposed on a circumference of a so-called Rowland circle. Two types of X-ray spectrometers have been used, in general, for the accomplishment of the aforesaid purpose. One of them is the rotation type in which the crystal and the detector are moved along the circumference of the Rowland circle the centre of which is fixed, and another is the linear type in which the centre of the Rowland circle is moved linearly in a constant direction with respect to the specimen, and the detector is also moved along the circumference of the circle.

According to the present invention there is provided an X-ray spectrometer apparatus comprising means for irradiating a specimen with an electron beam, an analysing crystal for diffracting a characteristic X-ray emitted from the specimen and a detector arranged in a plane, said analysing crystal being movable in the direction of the X-ray emission. The crystal and the specimen are positioned relative to each other so as to define a circle having a predetermined radius (so-called Rowland circle). A detector is provided for detecting the X-ray diffracted by the crystal and is movable in the direction of the diffraction of said X-ray while maintaining a position in which the detector faces the direction of the diffraction and is close to said crystal.

According to the present invention there is also provided an X-ray spectrometer apparatus comprising means for irradiating a specimen with an electron beam, an analysing crystal for diffracting characteristic X-rays emitted from said specimen, and the crystal and the specimen being positioned relative to each other so as to define a circle having a predetermined radius, and the crystal being movable along the circle. A detector is provided for detecting the X-rays diffracted by the crystal and is movable in the direction of the diffraction of the X-rays while maintaining a position in which the detector faces the direction of diffraction and is close to the crystal.

The present invention will be now described in detail in conjunction with the accompanying drawing in which:

FIG. 1 is a side view of a conventional linear type X-ray spectrometer;

FIG. 2 is a side view of an embodiment of a linear type X-ray spectrometer according to the present invention;

FIG. 3 shows a plan view of the X-ray spectrometers shown in FIGS. 1 and 2;

FIG. 4 shows an embodiment of the X-ray spectrometer of the rotation type according to the present invention.

Referring to FIG. 1 which illustrates the linear type spectrometer, a specimen 1, an analysing crystal 2 and a detector 3 are all disposed on a Rowland circle, the centre of which is located at 4. An electron beam travelling in a direction $a$ impinges upon the specimen 1 and characteristic X-rays are emitted from the specimen in a direction $b$. X-rays diffracted by the analysing crystal 2 in the direction $c$ are focused on a slit 6 of the detector 3. In this case, the analysing crystal 2 may be either of the Johann type which is shaped so as to form a curved surface having a radius of curvature twice as large as that of the Rowland circle or of the Johanson type which is made by grinding the Johann type crystal so as to form a curved surface having a radius of curvature which is as large as that of the Rowland circle. With such a crystal, X-rays emitted from the specimen 1 are diffracted by the analysing crystal 2 at substantially an equal angle all over the surface and the diffracted X-rays are focused upon the detector 3. In this case, if the lattice spacing of the crystal, angle of diffraction, order of diffraction, and wave length of the characteristic X-rays are represented by $d$, $\theta$, $n$ and $\lambda$, respectively, Bragg's equation:

$$2d \sin \theta = n\lambda \qquad (1)$$

holds. Further, if the distance between the specimen 1 and the centre of the crystal 2 and radius of the Rowland circle are represented by $l$ and $R$, respectively, and $$l = 2R \sin \theta \qquad (2)$$

From the Equations 1 and 2, we obtain $$\lambda = \frac{d}{nR} l$$

As $\lambda$ is proportionate to $l$, we can determine $\lambda$ from the measurement of $l$ and this is a distinguishing feature of the linear type.

But, as apparent from FIG. 1, since the specimen 1, the crystal 2 and the detector 3 are substantially spaced mutually, the X-ray spectrometer as a whole becomes inevitably so bulky that it is difficult to make the interior of the spectrometer of high vacuum and consequently the intensity of the X-rays is decreased because of the fact that X-rays of longer wave lengths are absorbed in the interior. Moreover, the long distance between the crystal and the detector results in a great loss of intensity of the X-rays and this leads to structural complexity. Thus, in FIG. 1, as the wave length varies, the angle of diffraction $\theta$ varies also according to Bragg's formula, $2d \sin \theta = n\lambda$, so that the crystal 2 and the detector 3 must be displaced far away in other positions 2' and 3' respectively, on another Rowland circle 4'.

A primary object of the present invention is that the above mentioned difficulty is overcome by arranging the detector in the path of the diffracted X-ray and close to the crystal instead of disposing it on the Rowland circle. An embodiment of the invention is illustrated in FIG. 2. The detector which was disposed at a position 3a on the Rowland circle in the prior art is now displaced to a position 3 adjacent the crystal in FIG. 2. Scattering of the X-ray emitted by the specimen 1 may be defined by a slit 5. The analysing crystal 2 is linearly movable in the direction of the emission of the characteristic X-rays and the centre of its curved surface is held on the circumference of the Rowland circle 4. The detector 3 can be moved in the direction of the diffracted X-ray while maintaining a position in which the detector faces the direction of diffraction and is near the crystal 2. The slit 5 may be located at a position suitably apart from the specimen 1. In FIGS. 2 and 3 reference numerals 2′ and 3′ represent the positions to where the crystal 2 and the detector 3, respectively, are displaced.

In this embodiment, it appears inconvenient to locate the detector out of focus of the diffracted X-rays on the circumference of the Rowland circle as described above, but it is not always necessary that all the focussing conditions must be satisfied theoretically since the wave length λ can be determined from the measurement of l. If the angle of diffraction θ of X-rays diffracted from all over the surface of the crystal is determined, only a particular characteristic X-ray corresponding to the angle θ is diffracted even though various characteristic X-rays are emitted from the specimen. As a result, therefore, each X-ray diffracted from all over the surface of the crystal has a substantially particular wave length corresponding to the diffraction angle. As for resolution of the crystal, if there is a high degree of misorientation in the analysing crystal, the resolution is in general not only limited but also reduced. The resolution of the conventional X-ray microanalyser, for instance, is about $$\Delta\theta = 3'30''$$

Accordingly, if misorientation of the crystal in the above embodiment according to the present invention is less than 3′30″, we can obtain resolution substantially of the same order as that obtained by means of the conventional apparatus. It is not so difficult to make a curved crystal having misorientation less than 3′30″.

The linear type X-ray spectrometer apparatus according to the present invention has many advantages as follows: Frist, the overall size of the spectrometer may be reduced so that the vessel of the apparatus can be easily evacuated to a high degree, and thus the intensity of the diffracted X-ray is increased and it is easier to mount a multiplicity of spectrometers within the vessel. Second, the intensity of the X-ray is increased. For the specimen 1, the crystal 2 and the slits 6 and 6a, of the spectrometer shown in FIG. 3, the intensity of X-rays increases in inverse proportion with the distance between the detector and the specimen. Third, although the apparatus of the present invention requires a mechanism for moving the crystal and the detector, the structure of the apparatus is simplified and thus the degree of precision can be reduced as compared with the conventional apparatus which requires a procedure to find the focus. Fourth, setting is very easy. In the prior art, it was required to satisfy the condition that the specimen 1, the crystal 2 and the detector 3 are on the same circumference and satisfy Bragg's equation, $2d \sin \theta = n\lambda$. According to the present invention, however, the setting condition can be satisfied by determining the direction of the detector in respect to the crystal and bringing into relation the distance between the specimen 1 and the analysing crystal 2 and θ in the equation $2d \sin \theta = n\lambda$. Fifth, direct reading of wave length is easily carried out. Direct reading of the desired wave length is always possible by changing R suitably if d varies freely.

Although the present invention has been described in reference to the linear type, the rotation type apparatus wherein the centre of the Rowland circle is fixed, is simple in structure and the invention may also be applied to this type of spectrometer.

Referring to FIG. 4 which illustrates an embodiment according to the present invention, X-rays emitted from a specimen 1 are diffracted by a crystal 2 having a cylindrical curved surface which is adapted to move along the circumference of the Rowland circle the centre of curvature of said cylindrical surface being located at the centre of the Rowland circle or a circle having a radius twice as large as that of the Rowland circle. Characteristic X-rays emitted from the specimen 1 are diffracted by the surface of the crystal 2 in the direction represented by c. In this embodiment, the detector is placed at position 3 adjacent to the crystal 2 instead of placing it at the focus 3a. This is a feature of the present invention and has an effect as that explained for the linear type. Further in this embodiment a wedge shaped shielding plate 5 is movable along with the crystal 2 so as to limit the scattered X-rays. In FIG. 4, reference numerals 2′, 3′ and 5′ represent the positions to which the crystal 2, the detector 3 and the shielding plate 5, respectively, are displaced with respect to the variation in the diffraction angle. In this respect, the rotation type has the same effect as the linear type. For example, the intensity of X-rays may be increased and its structure may be simplified. Moreover, any ratio of rotational rate between the crystal and the detector can be obtained as desired. The present invention can be applied also to various X-ray spectrometer apparatus which has a specimen in point form and is not limited only to the X-ray microanalyser with the above described effect.

What is claimed is:

1. A linear type X-ray spectrometer apparatus, comprising: means for irradiating a specimen with an electron beam for generating characteristic X-ray emission from the specimen along a first axis, diffraction means for diffracting the characteristic X-ray emission along a second axis determined by the direction of X-ray diffraction from said diffraction means, said first axis passing through said specimen and said diffraction means, detector means for detecting the diffracted X-ray emission, said diffraction means being movable along said first axis by a predetermined distance such that said diffraction means and said specimen are positioned on the circumference of a circle having a predetermined radius, and said detector means being movable along said second axis so as to be positioned at a point on said second axis within the circumference of said circle in closely spaced relation with said diffraction means.

2. The X-ray spectrometer apparatus according to claim 1 further comprising slit means which are located on said first axis at a point between said specimen and said diffraction means to limit the scattering of the X-ray emission from said specimen.

3. A rotational type X-ray spectrometer apparatus, comprising: means for irradiating a specimen with an electron beam for generating characteristic X-ray emission from the specimen, diffraction means for diffracting the characteristic X-ray emission, said specimen and said diffraction means being positioned relative to each other so as to lie on the circumference of a circle having a predetermined radius, said diffraction means being movable along the circumference of said circle, detector means for detecting the diffracted X-ray from said diffraction means, said detector means being movable along an axis determined by the diffracted X-rays and being positioned at a point on said axis within the circumference of said circle in closely spaced relation to said diffraction means.

4. An X-ray spectrometer apparatus according to claim 3, wherein said diffraction means includes shielding means which are positioned at a point on an axis normal to the diffraction surface of said diffraction means so as to limit the scattering of the X-ray emission from said specimen.

5. The spectrometer apparatus, comprising: means for irradiating a specimen with an electron beam for generating characteristic X-ray emission from the specimen, diffraction means for diffracting the characteristic X-ray emission, said specimen and said diffraction means being positioned relative to each other so as to lie on the circumference of a circle having a predetermined radius, detector means for detecting the diffracted X-ray from said diffraction means, said detector means being movable along an axis determined by the diffracted X-rays and being positioned at a point on said axis within the circumference of said circle in closely spaced relation to said diffraction means.

References Cited by the Examiner

UNITED STATES PATENTS

| | | | |
|---|---|---|---|
| 3,073,952 | 1/1963 | Rose | 250—51.5 |
| 3,200,248 | 8/1965 | Ogilvie | 250—51.5 |

OTHER REFERENCES

Encyclopedia of X-rays and Gamma Rays, Clark, Reinhold Publishing Company, New York, 1963, pp. 821 and 822.

X-ray Microscopy and X-ray Microanalysis; A Engstrom et al., Elsevier Publishing Company, New York, 1960, pp. 358–360.

RALPH G. NILSON, *Primary Examiner.*

ARCHIE R. BORCHELT, *Examiner.*

A. L. BIRCH, *Assistant Examiner.*